United States Patent
Tata et al.

(10) Patent No.: US 12,042,923 B2
(45) Date of Patent: Jul. 23, 2024

(54) ANTI-PINCH DEVICE FOR INSULATING IMPLEMENTATIONS

(71) Applicant: Honeywell International Inc., Charlotte, NC (US)

(72) Inventors: Raviteja Tata, Vuyyuru (IN); Prudhvi Yarlagadda, Hyderabad (IN); Rizwan Ahmad, Hyderabad (IN); Ashish Jain, Lucknow (IN); Christy Garippo, Lincolnshire, IL (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/806,284

(22) Filed: Jun. 10, 2022

(65) Prior Publication Data
US 2023/0398677 A1    Dec. 14, 2023

(51) Int. Cl.
*B25G 1/10* (2006.01)
*B25G 1/04* (2006.01)
*H02G 1/00* (2006.01)

(52) U.S. Cl.
CPC .............. *B25G 1/102* (2013.01); *B25G 1/04* (2013.01); *H02G 1/00* (2013.01)

(58) Field of Classification Search
CPC ... B25G 1/00; B25G 1/04; B25G 1/10; B25G 1/12; B25G 1/102; B25G 1/107; H02G 1/00; B25B 9/02; Y10T 403/32451; Y10T 403/32459
USPC ...... 81/22, 53.1, 177.2, 180.1, 489; 294/174
See application file for complete search history.

(56) References Cited

U.S. PATENT DOCUMENTS

| | | | |
|---|---|---|---|
| 3,788,691 A | 1/1974 | McMullin | |
| 4,332,178 A * | 6/1982 | Vukich | B25G 1/107 81/439 |
| 5,593,196 A * | 1/1997 | Baum | B25J 1/04 403/328 |
| 6,685,144 B1 * | 2/2004 | Wochnick | F16L 3/133 248/62 |
| 6,749,227 B2 | 6/2004 | Margid | |
| 8,469,423 B1 | 6/2013 | Crowley et al. | |

FOREIGN PATENT DOCUMENTS

| | | |
|---|---|---|
| CN | 105927630 A | 9/2016 |
| CN | 208629359 U | 3/2019 |
| CN | 209139275 U | 7/2019 |
| DE | 102020124196 A1 * | 3/2022 |
| KR | 10-2028010 B1 | 10/2019 |

OTHER PUBLICATIONS

DE102020124196—Machine Translation (Year: 2022).*

* cited by examiner

*Primary Examiner* — Brian D Keller
*Assistant Examiner* — Alberto Saenz
(74) *Attorney, Agent, or Firm* — Alston & Bird LLP (57) ABSTRACT

An anti-pinch device for use with an insulating apparatus and an insulating apparatus that includes the anti-pinch device are provided. The anti-pinch device includes a body configured to be at least partially disposed about an insulating apparatus. The body is configured to translate relative the insulating apparatus. The device further includes a pinch prevention mechanism attached to the body of the anti-pinch device. The pinch prevention mechanism is configured to prevent ingress of at least a portion of a user's finger into the insulating apparatus in an instance in which the user actuates an input element defined by the insulating apparatus.

17 Claims, 9 Drawing Sheets

ANTI-PINCH DEVICE FOR INSULATING IMPLEMENTATIONS

TECHNOLOGICAL FIELD

Embodiments of the present disclosure relate generally to insulating apparatuses and, more particularly, to mechanisms for preventing operator injuring in insulating implementations.

BACKGROUND

Electrical linemen are often concerned with preventing electrical shocks, especially when working with high voltage/amperage applications. Linemen may use an elongate stick, pole, hot stick, or shotgun stick to grab an electrical conductor (e.g., an electric wire, post, or ball stud) and ground the electrical conductor. Applicant has identified a number of deficiencies and problems associated with conventional insulating apparatuses. Through applied effort, ingenuity, and innovation, many of these identified problems have been solved by developing solutions that are included in embodiments of the present invention, many examples of which are described in detail herein.

BRIEF SUMMARY

Various embodiments are directed to an example anti-pinch device for use with an insulating apparatus. In accordance with some embodiments of the present disclosure, an example anti-pinch device is provided. In some embodiments, the anti-pinch device may include a body configured to be at least partially disposed about an insulating apparatus. The body may be configured to translate relative the insulating apparatus. The anti-pinch device may further include a pinch prevention mechanism attached to the body of the anti-pinch device, wherein the pinch prevention mechanism may be configured to prevent ingress of at least a portion of a user's finger into the insulating apparatus in an instance in which the user actuates an input element defined by the insulating apparatus.

In some embodiments, the body of the anti-pinch device may be configured to at least partially encircle a circular body defined by the insulating apparatus.

In some embodiments, the body of the anti-pinch device may be configured to be removably attached with the insulating apparatus.

In some embodiments, the anti-pinch device may further comprise a locking mechanism configured to secure the anti-pinch device with the insulating apparatus.

In some embodiments, at least a portion of the locking mechanism of the anti-pinch device may be movable so as to modify a dimension of an interior at least partially bounded by the body within which the insulating apparatus may be disposed.

In some embodiments, the anti-pinch device may further comprise a tool securing element configured to engage a tool defined by the insulating apparatus.

In some embodiments, the tool securing element of the anti-pinch device may be configured to move between a retracted position in which the tool securing element is disposed proximate the body and an extended position in which the tool securing element extends beyond a peripheral edge of the body.

In some embodiments, the pinch prevention mechanism of the anti-pinch device may further comprise an extension that extends from the body and is configured to receive an actuation by the user's finger.

In some embodiments, the extension of the pinch prevention mechanism may be configured to be disposed between the user's finger and the input element defined by the insulating apparatus.

In some embodiments, a distal end of the extension may further define a finger cavity configured to receive the user's finger therein.

In some embodiments, at least a portion of the extension between the finger cavity and body may define an adjustable membrane that deflects in response to the actuation by the user's finger.

In some embodiments, the pinch prevention mechanism of the anti-pinch device may further comprise a slider configured to translate relative the body of the anti-pinch device.

In some embodiments, the pinch prevention mechanism may be configured to translate between a retracted position in which the pinch prevention mechanism is supported by the body of the anti-pinch device and an extended position at which at least a portion of the slider is disposed between the user's finger and the input element defined by the insulating apparatus.

In some embodiments, the body of the anti-pinch device may be formed of an elastomeric material.

In accordance with some embodiments of the present disclosure, an example insulating apparatus is provided. In some embodiments, an insulating apparatus may comprise an apparatus body and an anti-pinch device. In some embodiments, the anti-pinch device may comprise a body configured to be at least partially disposed about the insulating apparatus, wherein the body is configured to translate relative the insulating apparatus. In some embodiments, the anti-pinch device may further comprise a pinch prevention mechanism attached to the body of the anti-pinch device, wherein the pinch prevention mechanism is configured to prevent ingress of at least a portion of a user's finger into the insulating apparatus in an instance in which the user actuates an input element defined by the insulating apparatus.

In some embodiments, the insulating apparatus may further comprise a tool securing element configured to engage a tool defined by the apparatus body.

In some embodiments, the tool securing element of the insulating apparatus may be configured to move between a retracted position in which the tool securing element is disposed proximate the body and an extended position in which the tool securing element extends beyond a peripheral edge of the body.

In some embodiments, the pinch prevention mechanism of the insulating apparatus may further comprise an extension that extends from the body and is configured to receive an actuation by the user's finger.

In some embodiments, the extension of the pinch prevention mechanism may be configured to be disposed between the user's finger and the input element defined by the insulating apparatus.

In some embodiments, the pinch prevention mechanism may further comprise a slider configured to translate relative the body of the anti-pinch device.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

FIGS. 7-8B illustrate perspective views of another example anti-pinch device of the present disclosure.

DETAILED DESCRIPTION

Overview

Example embodiments will be described more fully hereinafter with reference to the accompanying drawings, in which some, but not all embodiments of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Figure 1A:
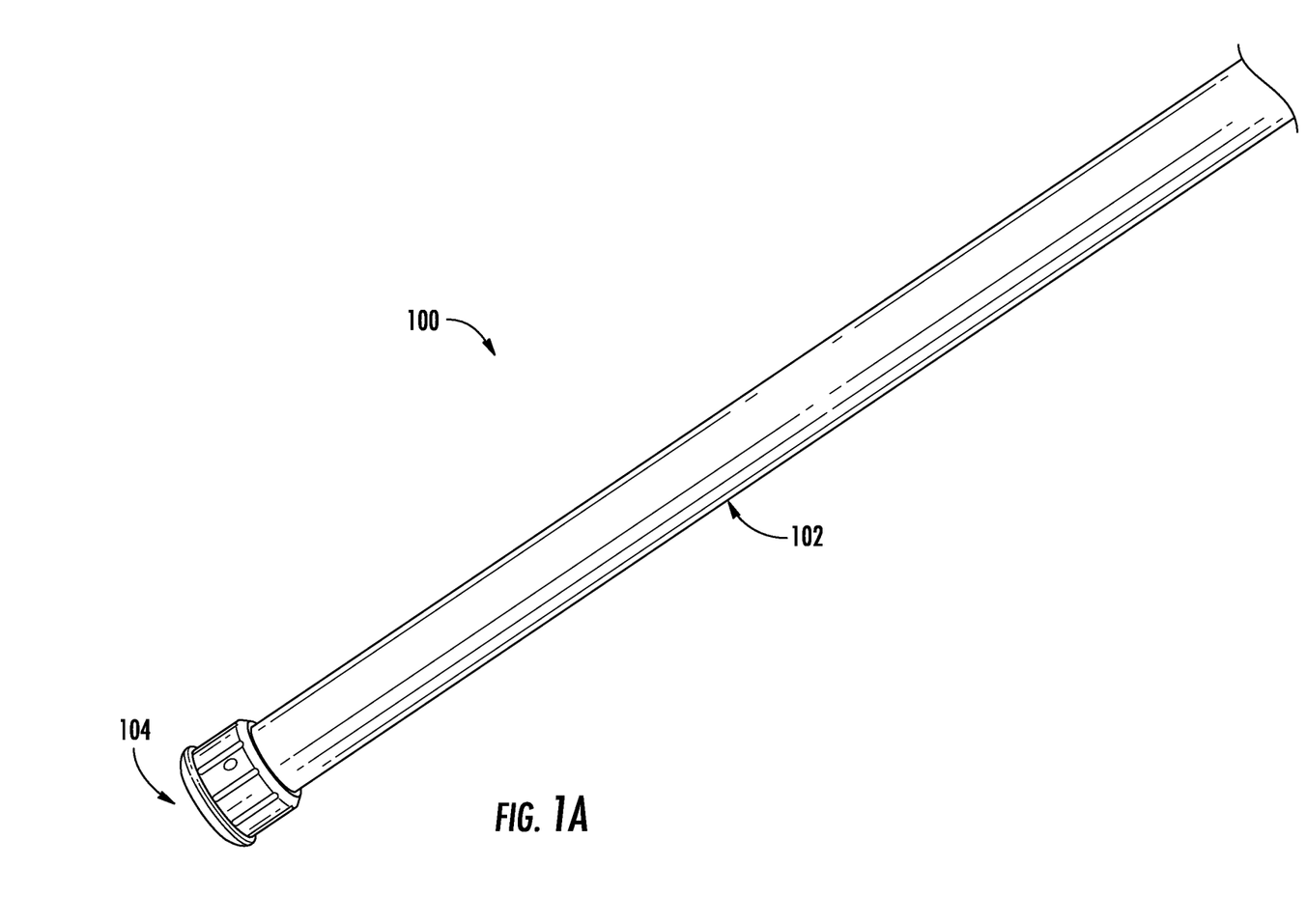
FIGS. 1A-1B illustrate perspective views of an example insulating apparatus with which the anti-pinch device of the present disclosure may be implemented in accordance with an example embodiment of the present disclosure.
Figure 1B:
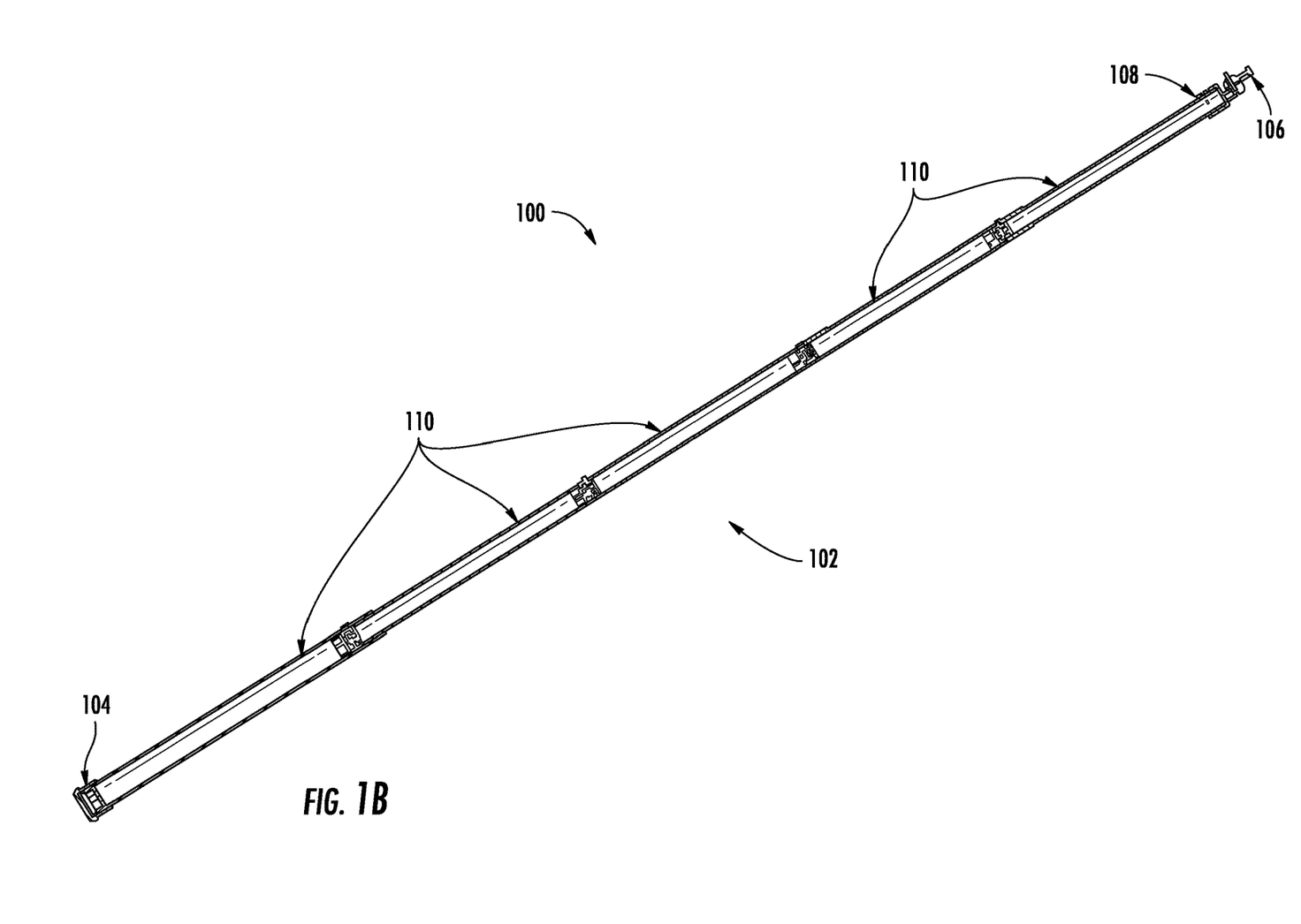

As shown in FIGS. 1A-1B, insulating apparatuses 100 may define a body 102 that is formed of a plurality of nested sections (e.g., sections 110 in FIG. 1B) that may sequentially retract and extend. A first end 104 of the body may be placed on the ground or otherwise supported by a user during operation, while a second end 108 may define a tool 106 with which a user interacts with an electrical line. In order to actuate or otherwise cause these sections 110 to move relative to one another (e.g., from a fully retracted configuration to an at least partially extended configuration), one or more input elements (e.g., buttons or the like) may be actuated by the user. In other words, a user may be required to press a button on a particular section of the insulating apparatus 100 in order to allow the particular section to nest at least partially within the adjacent section. In operation, however, a user's finger, glove, etc. may often accidently be pinched by this actuation operation. For example, a portion of a glove worn by a user may enter and be lodged within the insulating apparatus when the user actuates an input element (e.g., button or the like). This interaction is not only potentially painful to the user, but failure to properly nest sections of the insulating apparatus 100 may result in the user dropping the insulating apparatus 100. As such, the embodiments described herein operate to prevent the ingress of the user's finger during these operations so as to prevent damage to the user, the insulating apparatus, and or others proximate the user.

Anti-Pinch Device

Figure 2A:
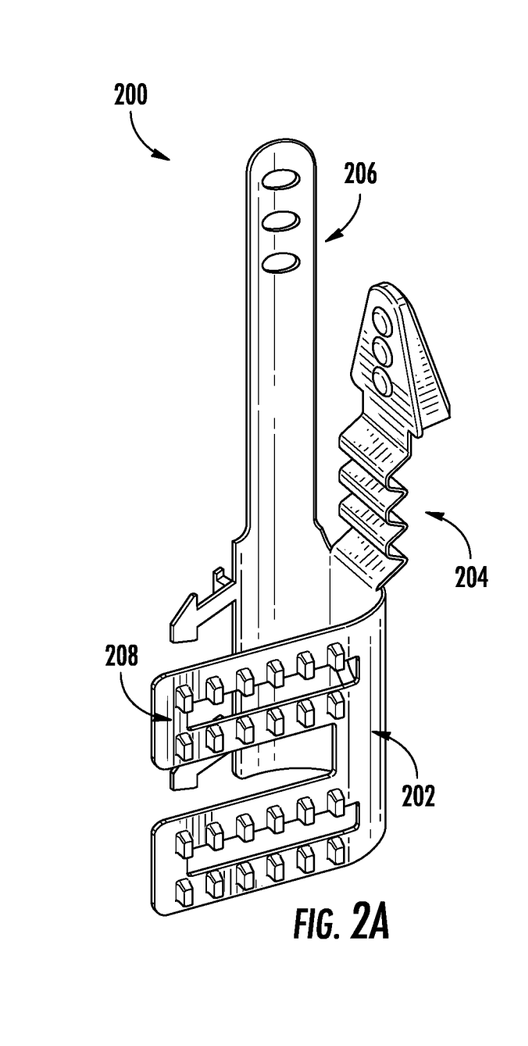
FIGS. 2A-2C illustrate perspective views of an example anti-pinch device of the present disclosure.
Figure 2B:
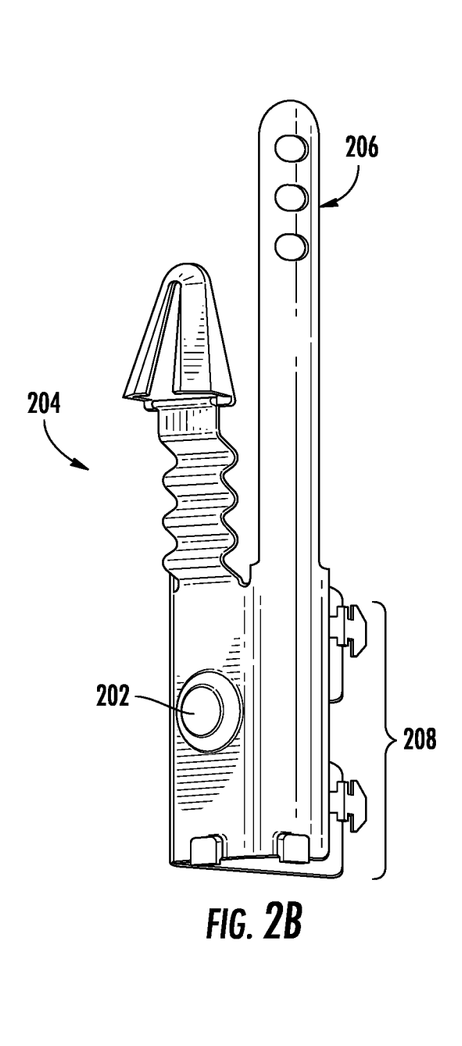
Figure 2C:
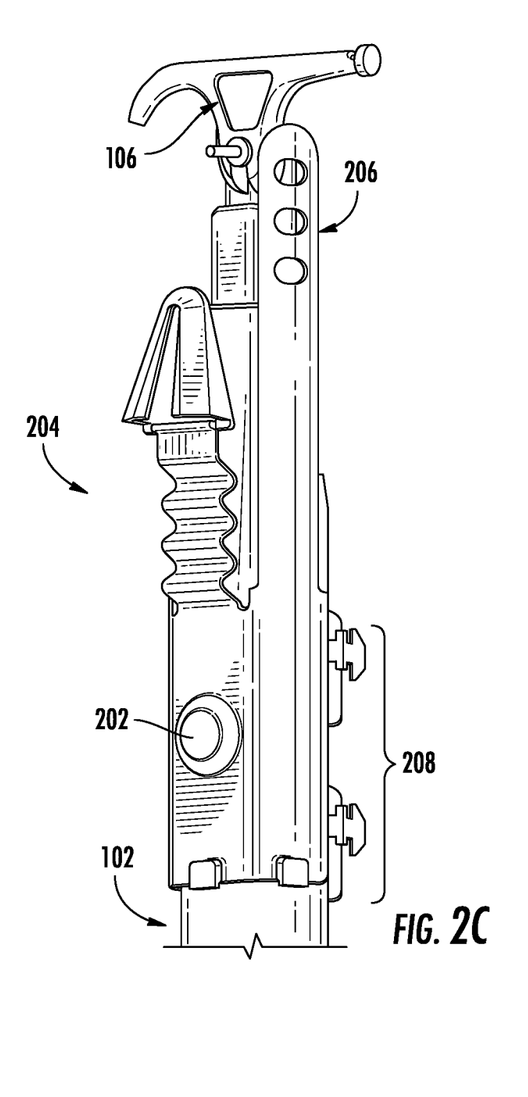

In order to solve these problems and others, the embodiments described herein may prevent ingress of at least a portion of a user's finger into the insulating apparatus 100 in an instance in which the user actuates the insulating apparatus 100. With reference to FIGS. 2A-2C, an example anti-pinch device 200 (e.g., device 200) is illustrated. As shown, the device 200 may include a body 202 that is configured to, as illustrated in FIG. 2C, be at least partially disposed about the insulating apparatus 100. The body 202 may be, in some embodiments, formed of an elastomeric material so as to encourage contact between the body 202 and the insulating apparatus 100 (e.g., so as to promote friction between the body 202 and the apparatus body 102).

In some embodiments, the insulating apparatus 100 with which the device 200 operates may be cylindrical in nature or otherwise define a circular cross-sectional shape. In such an embodiment, the body 202 may be configured to at least partially bound a semi-circular interior so as to be at least partially disposed about the body 102 of the insulating apparatus 100. In other words, the body 202 of the anti-pinch device 200 may be configured to at least partially encircle a circular body 102 defined by the insulating apparatus 100. Although illustrated and described herein with reference to a cylindrical body 102, the present disclosure contemplates that the body 102 of the insulating apparatus 100 (e.g., the apparatus body 102) may be dimensioned (e.g., sized and shaped) based upon the intended application of the insulating apparatus 100, for example, the body 102 may define a triangular or tri-flat cross-sectional shape. As such, the body 202 of the device 200 may similarly be dimensioned (e.g., sized and shaped) so as to provide a complimentary shaped interior (e.g., triangular or tri-flat interior) within which the apparatus body 102 may be positioned.

The body 202 may further be configured to translate relative the apparatus body 102. As described above, the insulating apparatus 100 may be formed of a plurality of sequentially nested sections 110 so as to extend and retract based upon the intended application of the insulating apparatus 100. As such, a user may be required to translate (e.g., slide) the device 200 along the length of the insulating apparatus 100 so as to actuate input elements defined by each of the sections 110 of the insulating apparatus 100. To this end, the anti-pinch device 200 may be configured to be removably attached to the apparatus body 102 and/or may be configured to, prior to being secured to the apparatus body 102 as described hereinafter, translate relative the apparatus body 102. Although described herein with reference to translational motion, the present disclosure contemplates that the device 200 may employ any movement mechanism, technique, etc. so as to be repositioned relative the insulating apparatus 100.

Figure 3A:
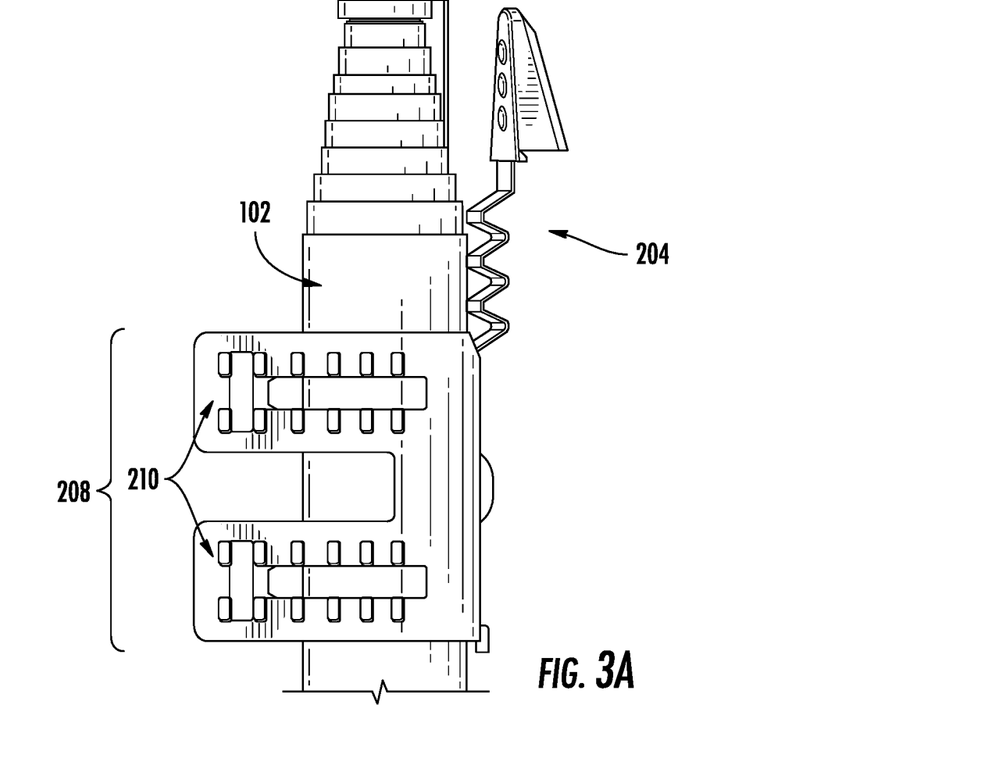
FIGS. 3A-3B illustrate an example locking mechanism for securing the anti-pinch device to an example insulating apparatus in accordance with an example embodiment of the present disclosure.
Figure 3B:
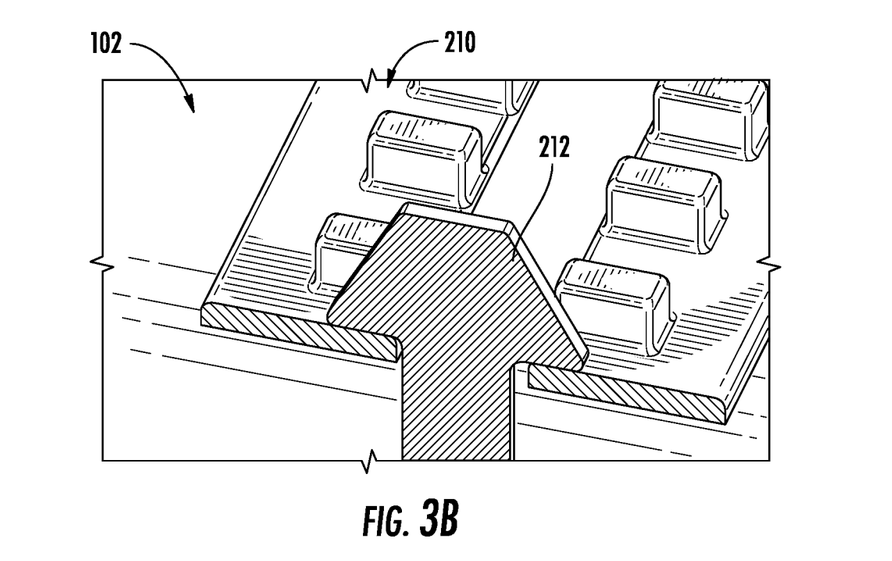

As illustrated in FIGS. 3A-3B, the device 200 may further include a locking mechanism 208 configured to secure the device 200 with the insulating apparatus 100. As shown, the locking mechanism 208 may, in some embodiments, be formed of a plurality of flanged portions 210 that extend at least partially around the apparatus body 102. The locking mechanism 208 may further employ an engagement end 212 that is placed or otherwise received by the flanged portions 210 so as to lock or otherwise fix the dimensions of the interior space defined by the body 102. By way of example, at least a portion (e.g., engagement end 212) of the locking mechanism 208, may be movable so as to modify a dimension of an interior at least partially bounded by the body 202 within which the insulating apparatus 100 is disposed. In other words, as the device 200 translates along the length of the insulating apparatus 100, the dimensions may change due to the nesting nature of the sections 110 that form the apparatus body 102. For example, the diameter or other dimensions of the device 200 may be reduced or enlarged as the device 200 moves from one nested section 110 of the apparatus body 102 to another, due to the variation in dimensions of the various sections 110 required to facilitate nesting. As such, the locking mechanism 208 may ratchet radially inward to accommodate smaller cross-sectional dimensions of the apparatus body 102 and may similarly ratchet radially outward to accommodate larger cross-sectional dimensions of the apparatus body 102. Although illustrated and described with reference to a ratcheting locking mechanism 208 which employs flanged portions 210 and an engagement end 212, the present disclosure contemplates that the locking mechanism 208 may include any feature that secures the body 202 to the apparatus body 102.

Figure 4A:
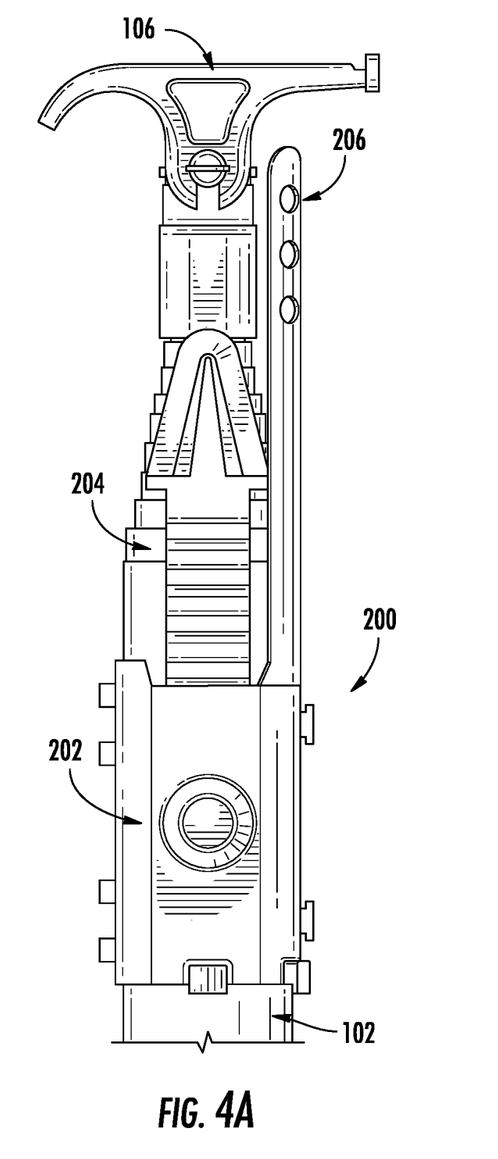
FIGS. 4A-4B illustrate example tool securing elements in accordance with an example embodiment of the present disclosure.
Figure 4B:
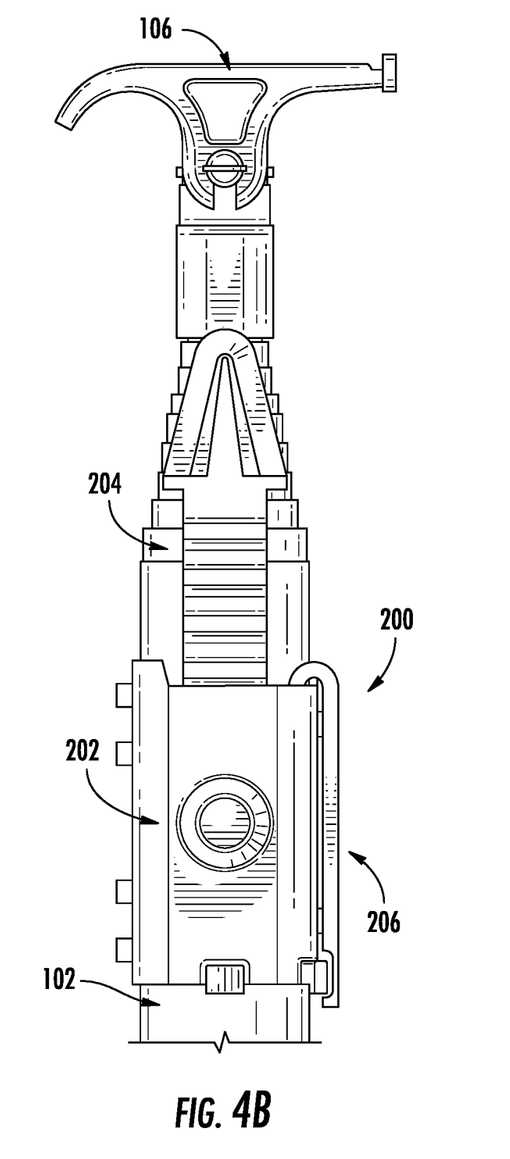

With reference to FIGS. 4A-4B, the device 200 may further include a tool securing element 206 configured to engage the tool 106 defined by the insulating apparatus 100. As described above, the second end 108 of the insulating apparatus 100 may define or otherwise be attached to a universal tool. A user of the insulating apparatus 100 may use the tool 106 attached to the second end 108 to interact with, for example, electrical lines. In order to prevent the tool from moving, in some embodiments the device 200 may leverage a tool securing element 206 that engages with the tool 106 so as to prevent the relative movement of the tool 106. As shown in FIG. 4A, the tool securing element 206 may be positioned in an extended position in which the tool securing element 206 extends beyond a peripheral edge of the body 202. In such a position, the tool securing element 206 may define one or more openings, slots, apertures, etc. within which at least a portion of the tool 106 may be placed. In doing so, the tool securing element 206 may operate to prevent or otherwise limit the movement of the tool 106, such as in instances in which the user causes the insulating apparatus 100 to retract (e.g., sequentially nest). As shown in FIG. 4B, the tool securing element 206 may move to a retracted position in which the tool securing element 206 is disposed proximate the body 202. In other words, the tool securing element 206 may rotate about its connection point with the body 202 so as to be stored on or near the body 202.

Figure 5A:
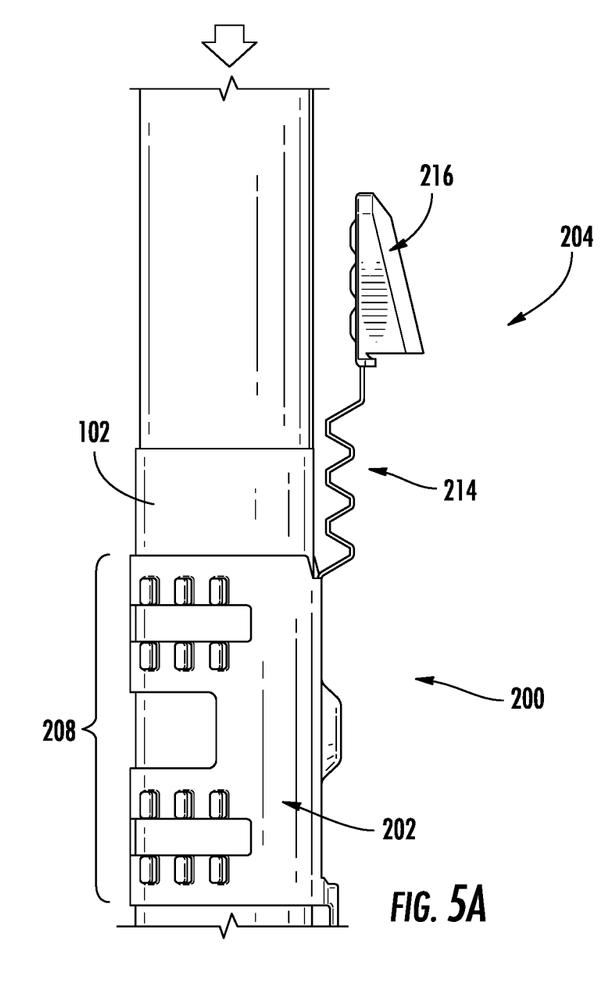
FIGS. 5A-5B illustrate an example pinch prevention mechanism in accordance with an example embodiment of the present disclosure.
Figure 5B:
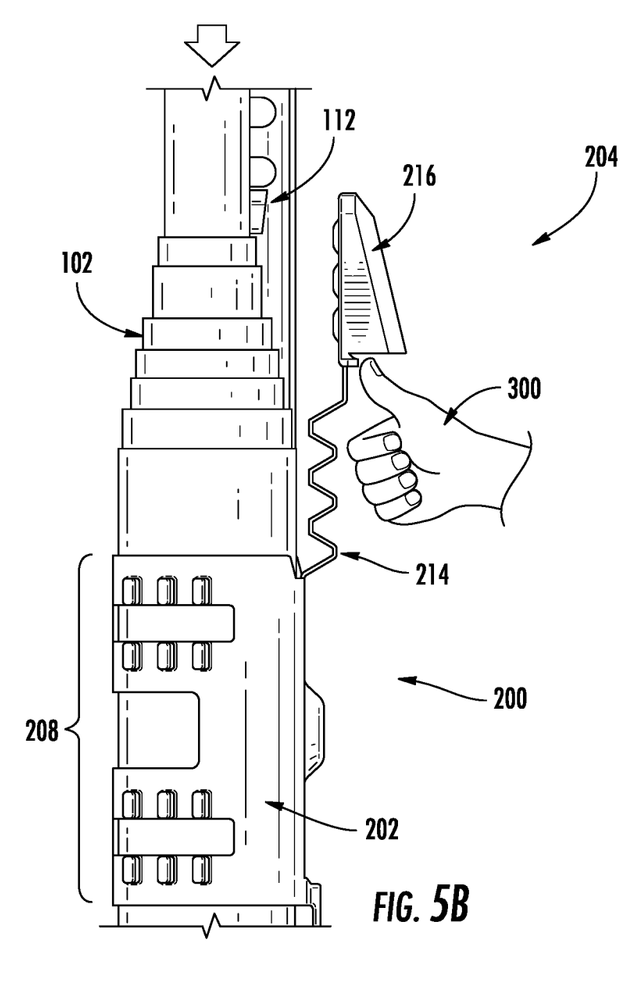

With reference to FIGS. 5A-5B, the device 200 may further include a pinch prevention mechanism 204. As shown, the pinch prevention mechanism 204 may be attached to the body 202 of the device 200 and be configured to prevent ingress of at least a portion of a user's finger 300 into the insulating apparatus 100 in an instance in which the user actuates an input element 112 defined by the insulating apparatus 100. As shown, the pinch prevention mechanism 204 may include an extension that extends from the body 202 and is configured to receive an actuation by the user's finger 300, such as via engagement between the user finger 300 and a finger cavity 216 defined by the pinch prevention mechanism 204. As would be evident in light of the intended operation of the insulating apparatus 100, direct contact between the user's finger 300 and the input element 112 may result in at least a portion of the user's finger 300 entering (e.g., being pinched by) the insulating apparatus 100. As such, the embodiments of the present disclosure provide the pinch prevention mechanism 204 so as to position a portion of the extension illustrated in FIGS. 5A-5B between the user's finger 300 and the input element 112. In this way, the pinch prevention mechanism 204 may prevent direct interaction between the user's finger 300 and the input element 112 and, therefore, prevent the unintentional ingress of at least a portion of a user's finger 300 into the insulating apparatus 100.

As shown, the pinch prevention mechanism 204 may define a finger cavity 216 that receives the user's finger 300. The user may input an actuation force on the finger cavity 216 that causes an adjustable membrane 214 (e.g., a portion of the extension that extends beyond the body 202) to deflect toward the input element 112. In other words, the pinch prevention mechanism 204 in FIGS. 5A-5B may operate as a leaf spring in which the adjustable membrane 214 urges the user's finger 300 in a direction opposite of actuation of the input element 112. By applying actuation force to the finger cavity 216, the user may urge the finger cavity 216 toward the input element 112, allowing the user to apply sufficient actuation force to suppress the input element 112 without exposing the user's finger 300 to unintentional ingress into the insulating apparatus 100.

Figure 6A:
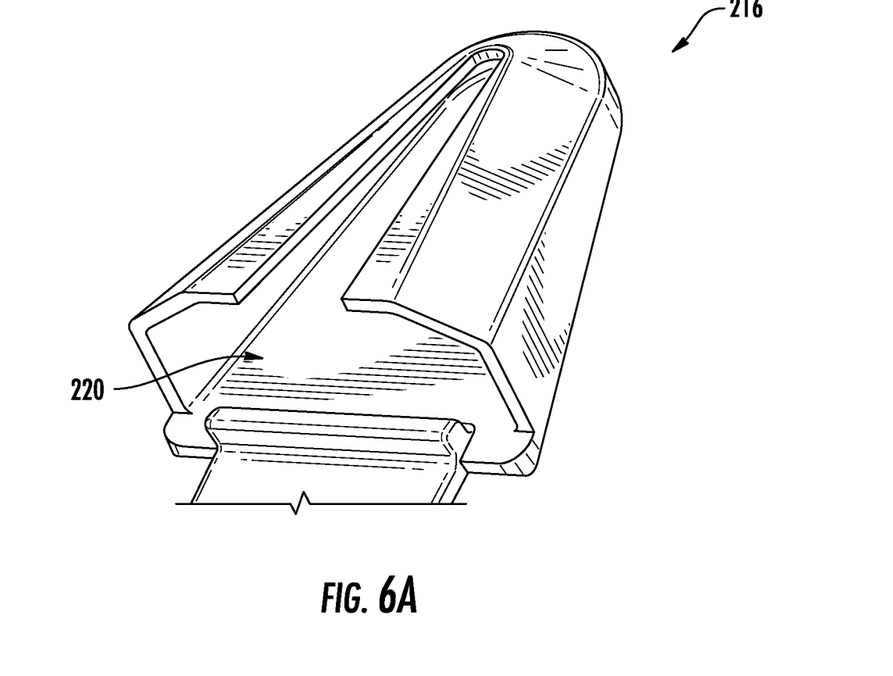
FIGS. 6A-6B illustrate example finger cavities of the pinch prevention mechanism of the present disclosure.
Figure 6B:
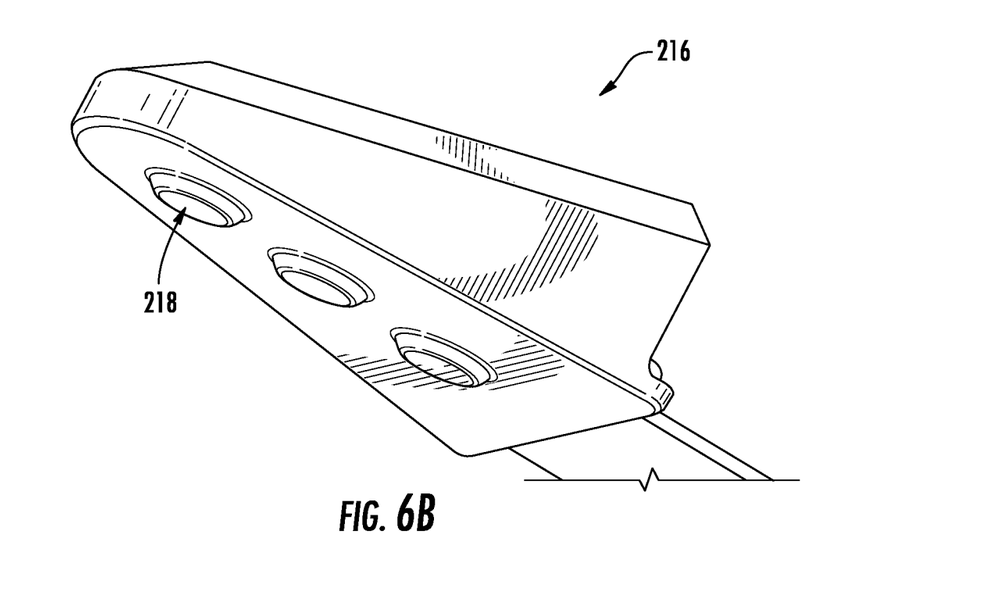

With reference to FIGS. 6A-6B, the pinch prevention mechanism 204 may further include a finger cavity 216. As shown, the finger cavity 216 may be any device providing a barrier between the user's finger 300 and the input element 112. The finger cavity may partially or fully enclose the user's finger 300 and provide an opening 220 capable of receiving a user's finger 300. As shown, the finger cavity 216 may be formed to fit the dimensions of a user's finger 300, for example by tapering the width of the finger cavity 216 along the length moving away from the opening 220. The finger cavity 216 may further include an expandable channel along the length of the side of the finger cavity opposite the apparatus body 102, providing flexibility in accommodating various sized fingers.

The finger cavity may be utilized by a user to actuate the input element 112 while preventing ingress of at least part of the user's finger 300 into the apparatus body 102, by allowing the user to force the finger cavity 216 toward the input element 112, causing the finger cavity 216 to come into contact with the input element 112. As shown, the finger cavity 216 may be textured, define bumps (e.g., 218), ridges, protrusions, etc. on the side of the finger cavity 216 adjacent the apparatus body 102 and input element 112. The texture, bumps (e.g., 218), ridges, protrusions, etc. may promote contact between the finger cavity 216 and the input element 112 when a user is utilizing the finger cavity 216.

Figure 7:
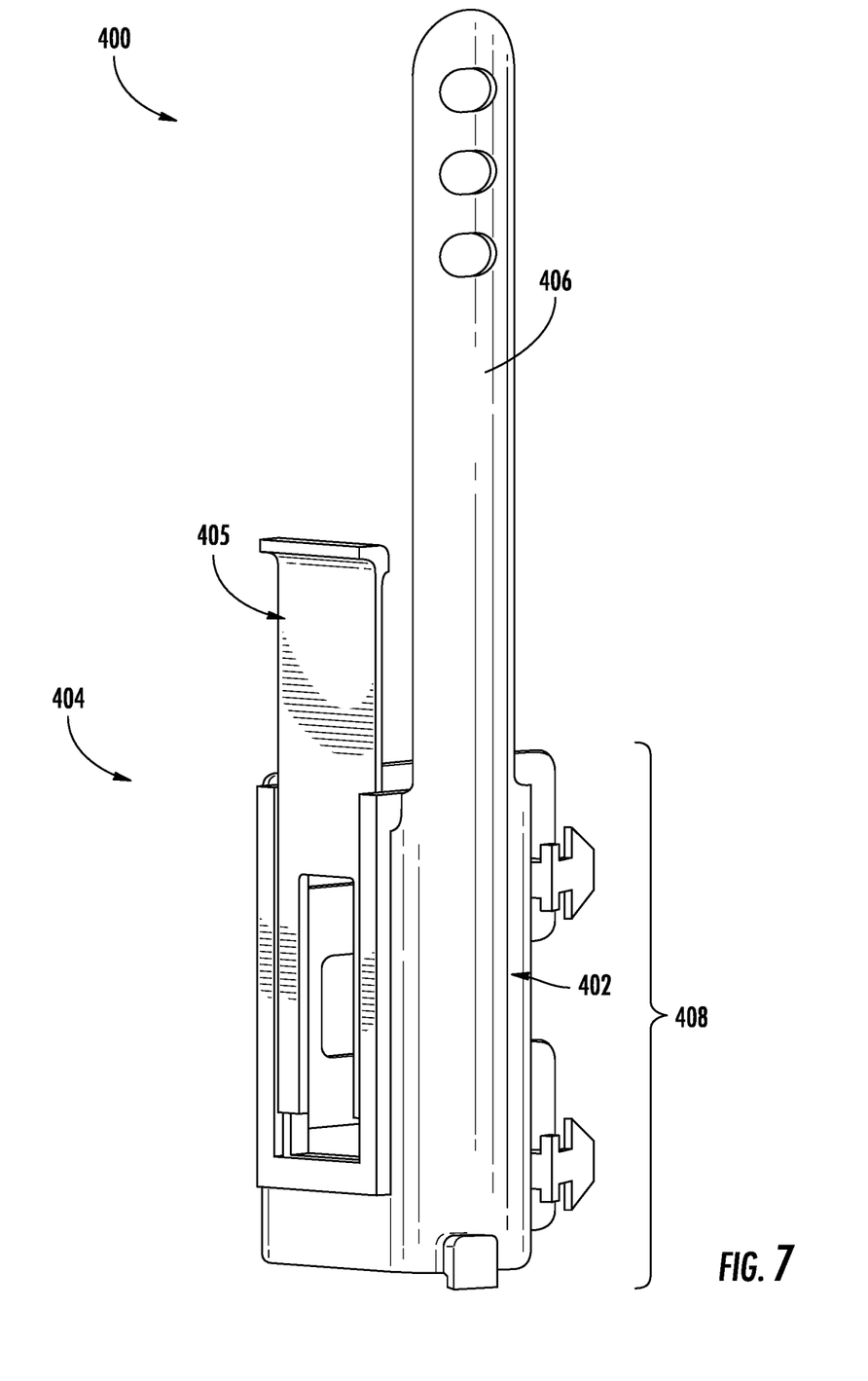

With reference to FIG. 7, an example embodiment anti-pinch device 400 is illustrated. As shown, the device 400 may include a body 402 that is configured to, be at least partially disposed about the insulating apparatus 100. The body 402 may be, in some embodiments, formed of an elastomeric material so as to encourage contact between the body 402 and the insulating apparatus 100 (e.g., so as to promote friction between the body 402 and the apparatus body 102).

As further described in relation to the body 202 of the previous embodiment, the body 402 of the anti-pinch device 400 may be configured to at least partially encircle a circular body 102 (or any other apparatus body 102 dimensioned based upon the intended application of the insulating apparatus 100, such as a triangular or tri-flat apparatus body 102).

As such, the body 402 of the device 400 may similarly be dimensioned (e.g., sized and shaped) so as to provide a complimentary shaped interior within which the apparatus body 102 may be positioned. In addition, the body 402 may similarly be configured to be removably attached to the apparatus body 102 and/or translate relative the apparatus body 102 along the length of the insulating apparatus 100 so as to actuate input elements defined by each of the sections 110 of the insulating apparatus 100.

As further described in relation to the locking mechanism 208 of the previous embodiment, the device 400 may also include a locking mechanism 408 configured to secure the device 400 with the insulating apparatus 100. Although illustrated with reference to a ratcheting locking mechanism 408, the present disclosure contemplates that the locking mechanism 408 may include any feature that secures the body 402 to the apparatus body 102.

As further described in relation to the tool securing element 206 of the previous embodiment, the device 400 may also include a tool securing element 406 configured to engage the tool 106 defined by the insulating apparatus 100. As described above, the tool securing element 406 may operate to prevent or otherwise limit the movement of the tool 106, such as in instances in which the user causes the insulating apparatus 100 to retract (e.g., sequentially nest).

As shown in FIG. 7, the device 400 may further include a pinch prevention mechanism 404. As shown, the pinch prevention mechanism 404 may be attached to the body 402 of the device 400 and be configured to prevent ingress of at least a portion of a user's finger 300 into the insulating apparatus 100 in an instance in which the user actuates an input element 112 defined by the insulating apparatus 100. As shown, the pinch prevention mechanism 404 may include a finger slide 405 that may be extended from the body 402 and is configured to act as a barrier between the user's finger 300 and the input element 112. As would be evident in light of the intended operation of the insulating apparatus 100, direct contact between the user's finger 300 and the input element 112 may result in at least a portion of the user's finger 300 entering (e.g., being pinched by) the insulating apparatus 100. As such, the embodiments of the present disclosure provide the pinch prevention mechanism 404 so as to position a portion of the finger slide 405 illustrated in FIGS. 8A-8B between the user's finger 300 and the input element 112. In this way, the pinch prevention mechanism 404 may prevent direct interaction between the user's finger 300 and the input element 112 and, therefore, prevent the unintentional ingress of at least a portion of a user's finger 300 into the insulating apparatus 100.

Figure 8A:
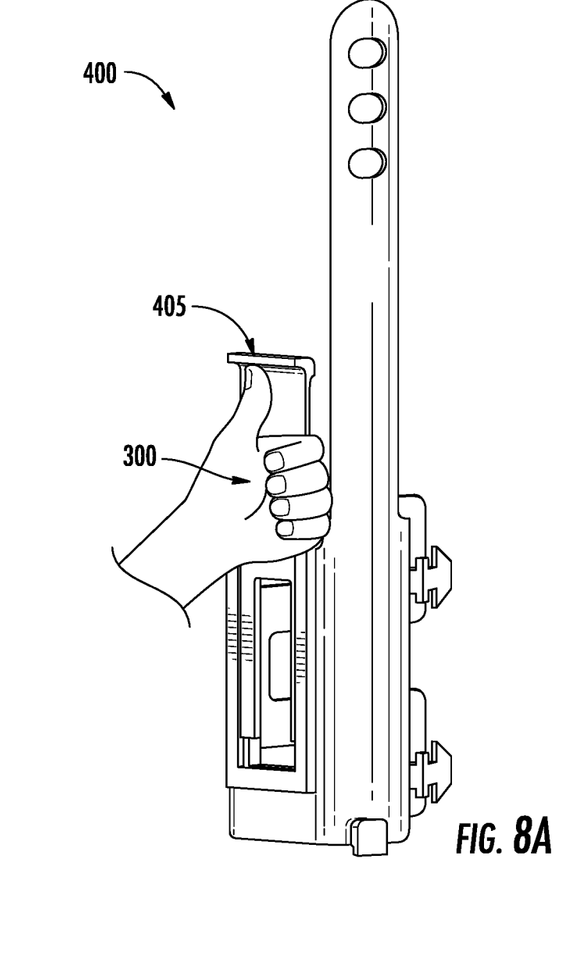
Figure 8B:
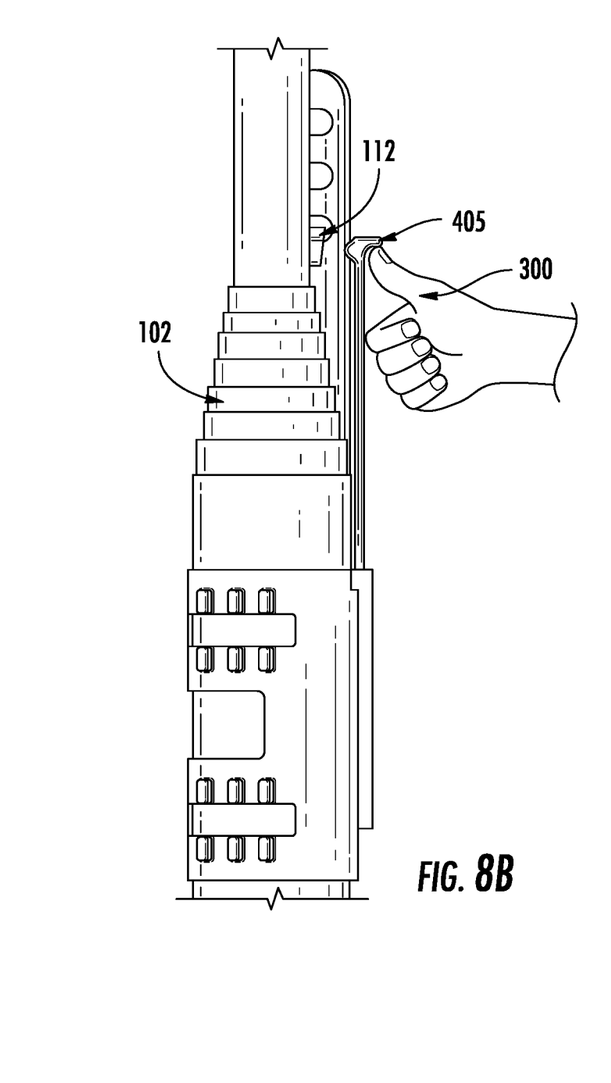

As shown in FIGS. 8A-8B, a pinch prevention mechanism 404 may further include a slider (e.g., finger slide 405) configured to translate relative the body 402 of the anti-pinch device 400. The finger slide 405 may be configured to engage with the body 402 such that the finger slide 405 may be configured to translate between a retracted position in which the pinch prevention mechanism 404 is supported by the body 402 of the anti-pinch device 400 and an extended position at which at least a portion of the finger slide 405 is disposed between the user's finger 300 and the input element 112 defined by the insulating apparatus 100.

As depicted, the finger slide 405 may be any mechanism configured to extend/retract and provide a barrier between the user's finger 300 and the input element 112 when the finger slide 405 is forced into contact with the input element 112. In some embodiments, the user may provide a force in a direction parallel to the axis of the attached apparatus body 102 to extend the distil end of the finger slide 405 beyond the peripheral edge of the body 402 until the distil end of the finger slide 405 is substantially aligned with the input element 112. In some embodiments, a protrusion, lip, or other feature may be disposed on the finger slide 405 to be engaged by the user and facilitate extension of the finger slide 405 away from the body 402 of the anti-pinch device 400. By applying actuation force to the finger slide 405 when extended, the user may urge the finger slide 405 toward the input element 112, allowing the user to apply sufficient actuation force to suppress the input element 112 without exposing the user's finger 300 to unintentional ingress into the insulating apparatus 100. In some embodiments, the finger slide 405 may retract toward the body 402 automatically. In other embodiments, the finger slide 405 may be returned to a retracted position by a user.

In some embodiments, the finger slide 405 may be textured, define bumps, ridges, protrusions, etc. on the side of the finger slide 405 adjacent the apparatus body 102 and input element 112. The texture, bumps, ridges, protrusions, etc. may promote contact between the finger slide 405 and the input element 112 when a user is utilizing the finger slide 405 to depress the input element 112.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. The disclosed embodiments relate primarily to insulating apparatuses, however, one skilled in the art may recognize that such principles may be applied to a pole saw, a window washing pole, a dusting pole, a general telescoping extension pole, or any other similar device. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of" and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. An anti-pinch device for use with an insulating apparatus, the device comprising:
   a body configured to be at least partially disposed about the insulating apparatus, wherein the body is configured to translate relative the insulating apparatus;
   a pinch prevention mechanism attached to the body of the anti-pinch device,
   wherein the pinch prevention mechanism is configured to prevent ingress of at least a portion of a user's finger into the insulating apparatus in an instance in which the user actuates an input element defined by the insulating apparatus;
   a locking mechanism configured to secure the anti-pinch device with the insulating apparatus, the locking mechanism comprising a plurality of flanged portions and an engagement end configured to engage with the plurality of flanged portions, wherein the engagement allows variance of a dimension of the body when the body translates relative the insulating apparatus; and
   a tool securing element configured to engage a tool defined by the insulating apparatus and rotate about a connection point thereof with respect to the body, wherein the rotation allows storage of the tool securing element on the body.

2. The anti-pinch device according to claim 1, wherein the body of the anti-pinch device is configured to at least partially encircle a circular body defined by the insulating apparatus.

3. The anti-pinch device according to claim 2, wherein the body of the anti-pinch device is configured to be removably attached with the insulating apparatus.

4. The anti-pinch device according to claim 1, wherein at least a portion of the locking mechanism is movable so as to modify a dimension of an interior at least partially bounded by the body within which the insulating apparatus is disposed.

5. The anti-pinch device according to claim 1, wherein the tool securing element is configured to move between a retracted position in which the tool securing element is disposed proximate the body and an extended position in which the tool securing element extends beyond a peripheral edge of the body.

6. The anti-pinch device according to claim 1, wherein the pinch prevention mechanism further comprises an extension that extends from the body and is configured to receive an actuation by the user's finger.

7. The anti-pinch device according to claim 6, wherein the extension is configured to be disposed between the user's finger and the input element defined by the insulating apparatus.

8. The anti-pinch device according to claim 6, wherein a distal end of the extension further defines a finger cavity configured to receive the user's finger therein.

9. The anti-pinch device according to claim 8, wherein at least a portion of the extension between the finger cavity and the body defines an adjustable membrane that deflects in response to the actuation by the user's finger.

10. The anti-pinch device according to claim 1, wherein the pinch prevention mechanism further comprises a slider configured to translate relative the body of the anti-pinch device.

11. The anti-pinch device according to claim 10, wherein the pinch prevention mechanism is configured to translate between a retracted position in which the pinch prevention mechanism is supported by the body of the anti-pinch device and an extended position at which at least a portion of the slider is disposed between the user's finger and the input element defined by the insulating apparatus.

12. The anti-pinch device according to claim 1, wherein the body is formed of an elastomeric material.

13. An insulating apparatus comprising:
    an apparatus body; and
    an anti-pinch device comprising:
       a body configured to be at least partially disposed about the insulating apparatus,
          wherein the body is configured to translate relative the insulating apparatus;
       a pinch prevention mechanism attached to the body of the anti-pinch device,
          wherein the pinch prevention mechanism is configured to prevent ingress of at least a portion of a user's finger into the insulating apparatus in an instance in which the user actuates an input element defined by the insulating apparatus;
       a locking mechanism configured to secure the anti-pinch device with the insulating apparatus, the locking mechanism comprising a plurality of flanged portions and an engagement end configured to engage with the plurality of flanged portions, wherein the engagement allows a variance of a dimension of the body when the body translates relative the insulating apparatus; and
       a tool securing element configured to engage a tool defined by the insulating apparatus and rotate about a connection point thereof with respect to the body, wherein the rotation allows storage of the tool securing element on the body.

14. The insulating apparatus according to claim 13, wherein the tool securing element is configured to move between a retracted position in which the tool securing element is disposed proximate the body and an extended position in which the tool securing element extends beyond a peripheral edge of the body.

15. The insulating apparatus according to claim 13, wherein the pinch prevention mechanism further comprises an extension that extends from the body and is configured to receive an actuation by the user's finger.

16. The insulating apparatus according to claim 15, wherein the extension is configured to be disposed between the user's finger and the input element defined by the insulating apparatus.

17. The insulating apparatus according to claim 16, wherein the pinch prevention mechanism further comprises a slider configured to translate relative the body of the anti-pinch device.

* * * * *